June 27, 1939.   F. C. REED   2,163,630
PROCESS OF PRODUCING CARBON BLACK
Filed May 14, 1936   3 Sheets-Sheet 2

INVENTOR
Forrest C. Reed

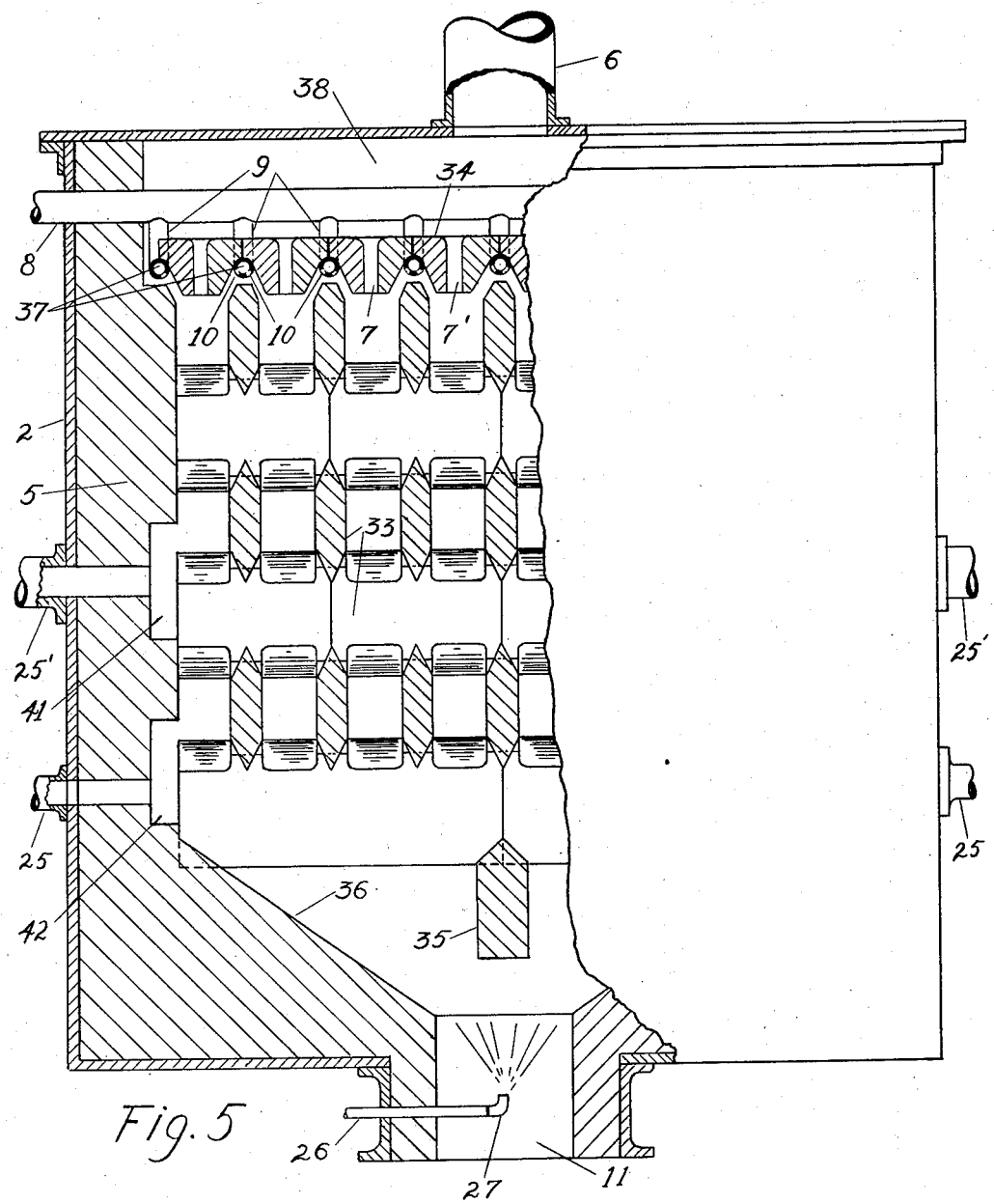
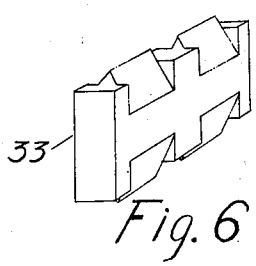
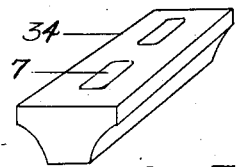

Patented June 27, 1939

2,163,630

UNITED STATES PATENT OFFICE 2,163,630

PROCESS OF PRODUCING CARBON BLACK

Forrest C. Reed, Kansas City, Mo.

Application May 14, 1936, Serial No. 79,735

12 Claims. (Cl. 134—60)

This invention relates to the production of carbon black by the incomplete combustion of hydrocarbons under the catalytic influence of refractory surfaces, and the primary object of the invention is to provide a continuous method of producing a carbon black of superior quality such as is known to the trade as hard carbon. Another object is to provide a method of obtaining higher yields of hard carbon than is obtained by the present methods such as the channel processes and still retain the desirable characteristics of channel black.

Hard carbon is very fine and when compounded in rubber, it gives to the rubber a high tensile strength and the stiffening quality desirable for such uses as the manufacture of automobile tire casings. Hard carbon is now produced by the well known channel processes or modifications of the same and the yield is, in general, less than 1½ pounds per thousand cubic feet of natural gas. Since the channel processes operate on the principle of incomplete combustion, attempts have been made to produce hard carbon by carrying out an incomplete combustion of hydrocarbons in unobstructed furnaces of large dimensions. Such methods are objectionable because in the absence of contacting surfaces, the dissociation is slow and the carbon black produced is subjected to the deteriorating effect of prolonged heating.

Other attempts have been made to produce hard carbon by passing a hydrocarbon thru a flame, or thru a flame and past a refractory surface in which case hydrocarbons to be dissociated are passed between a furnace wall and a central burning combustible mixture of gas and air, the object being to bring about dissociation by thermal means rather than by incomplete combustion. By other methods, air is admitted between a furnace wall and a central stream of hydrocarbons to be dissociated so as to prevent the carbon from contacting the furnace walls.

Carbon blacks are classed as hard or soft according to the modulus at a given elongation (usually 400%) of rubber compounded therewith, the hard blacks having a modulus usually about double that of soft blacks for a given curing time. Channel black has other notable characteristics besides hardness, as e. g. the tensile strength of rubber compounded therewith increases with the time of cure from about 20 minutes to 60 minutes while the elongation at the breaking point generally increases to a maximum and then decreases between 20 and 60 minute cures, while the tensile strength and elongation of rubber similarly compounded with soft blacks decrease with longer cures than about 20 minutes.

While some of the above mentioned attempts to produce a channel grade of hard black may produce a high modulus black, yet the blacks thus produced do not have the other above mentioned notable characteristics of channel black but, on the contrary, they follow the trend of soft blacks in this respect.

I have discovered that higher yields of very fine hard carbon having also the other above mentioned notable characteristics of channel black can be produced by introducing an enveloping flow of a hydrocarbon to be dissociated between a refractory surface and a central stream of air or other oxygen-supplying gas. While this invention is not based on any particular theory, yet the initial flame produced by this method appears clearly defined and hollow and the following facts are to be noted: When a gas jet burns openly in the air, the flame first bulges at the middle and then converges to a point similar to that of a candle. If the gas jet is enclosed within a tube of restricted cross-sectional area and supplied with an excess of air for complete combustion the flame remains substantially the same. If, however, the air supplied to tube and enveloping the gas jet is limited to a quantity less than that required for complete combustion, then the gas will burn in a flame diverging in the shape of an inverted cone from the gas jet toward the side of tube. In other words, the flame leans toward the air supply when the air is insufficient for complete combustion. In making use of this principle and in order to produce a flame within a closed retort passage which does not diverge against the wall of passage but tends to converge away from the wall and in a shape similar to a gas jet burning openly in the air, I utilize a central and predominating air stream within an enveloping and somewhat turbulent gas flow in the same general direction through a closed retort passage relatively short in length and sufficiently restricted in cross-sectional area as to form a restricted enveloping space for gas flow around the air stream and between it and the passage wall thereby effecting the initial partial combustion at the outer surface of the air stream and producing a flame tending to converge toward the axis of air stream and away from the wall of retort passage. As the incomplete combustion ensues and free carbon is liberated, it appears that the carbon particles diffuse toward the center of the stream and therefore only a small portion of the carbon produced actually contacts the refractory surface and since the method of this invention permits of a short length of furnace and a comparatively high velocity of the dissociation products, this carbon in any event can contact the refractory surface at the dissociation zone for only a fraction of one second. I have found that by this method the refractory surface has a decidedly catalytic influence in expediting the dissociation of hydrocarbons and without any deteriorating effect on the quality of the carbon produced as only a relatively short length of refractory surface is required.

I have further discovered that with the process of the present invention, even tho the flow of gases thru the furnace is turbulent, the flame appears hollow. Therefore no attempt is made to introduce the hydrocarbons and oxidizing agent into the furnace with equal velocities, in fact, I have obtained better results by introducing the hydrocarbons into the furnace at much higher velocities than those of the oxidizing agent so as to insure turbulent flow.

Referring to the drawings in which like numerals of reference indicate similar parts thruout:

Fig. 5 is an elevation partly in section showing still another modification of apparatus.

Fig. 6 is a perspective view of a checkerwork unit 33 of Fig. 5.

Fig. 7 is a perspective view of refractory nozzle 34 of Fig. 5.

Figure 1:
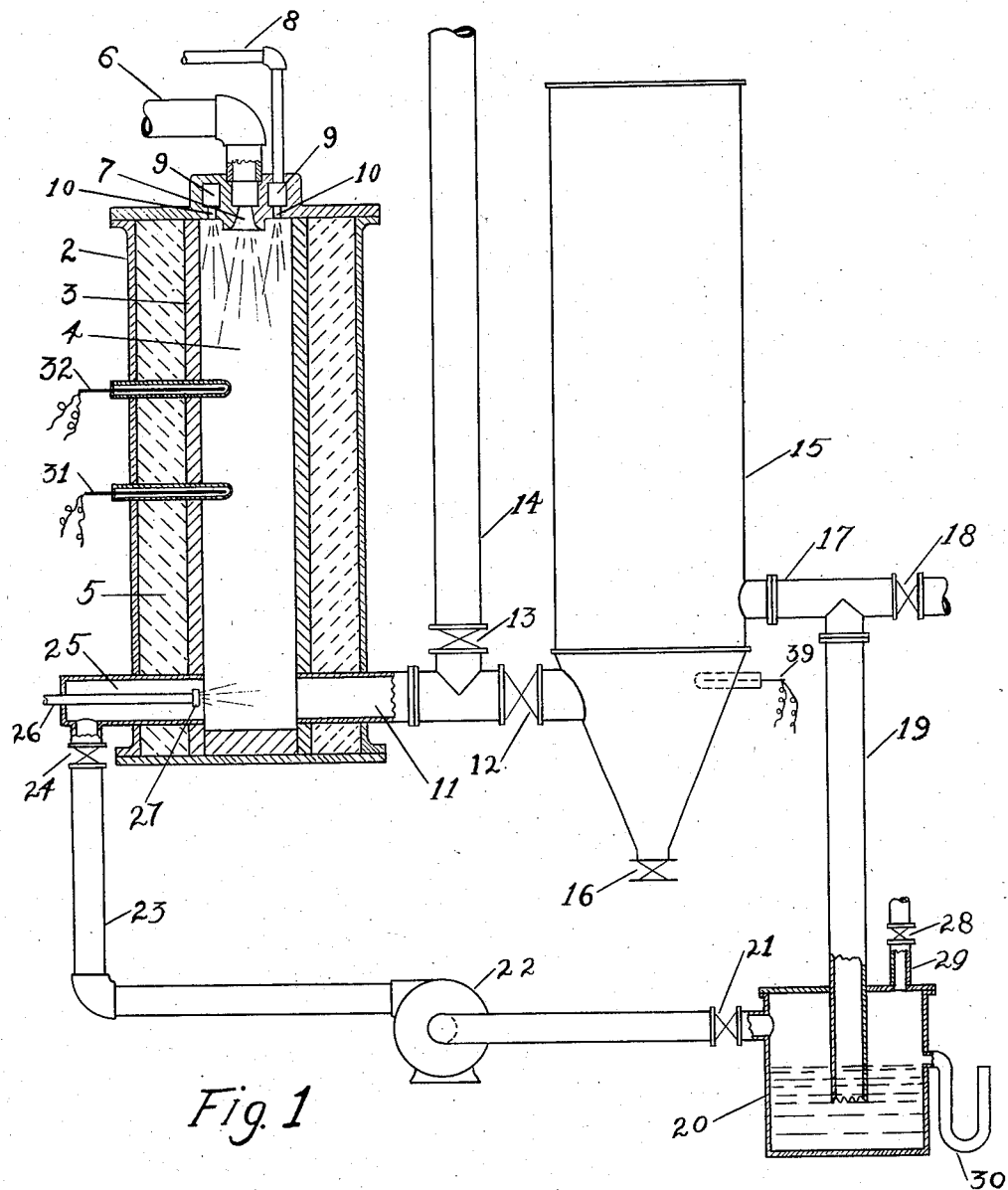
Fig. 1 is an elevation partly in central section showing one type of apparatus suitable for carrying out the process of the present invention.

Referring now to Fig. 1 which shows a vertical central section thru one type of furnace suitable for carrying out the process of the present invention: 2 is an outer shell preferably of steel construction, 3 is the furnace lining of refractory material, 5 is a suitable insulating material between the furnace lining 3 and outer shell 2, 31 and 32 are thermocouples for indicating the temperature in the furnace 4, 15 is a carbon separator of any well known design, such as an electrical precipitator or bag type of filter, and 20 is a wash-box for removing the condensible products from the exit gases.

In operation, an oxidizing agent such as air and insufficient in quantity for complete combustion is admitted thru pipe 6 and nozzle 7 to the furnace 4 while a hydrocarbon gas such as natural gas is admitted thru pipe 8 to the annular chamber 9 surrounding the air nozzle 7 and thru a plurality of ports 10 to furnace 4 where an incomplete combustion of the hydrocarbon ensues under the catalytic influence of the refractory surface so as to produce very fine carbon black particles, and it is also evident that the heat radiated to the top of furnace will result in a preheating of the gases. The heat thus produced is sufficient to maintain a short portion of the furnace wall at the dissociation temperature of the hydrocarbon so that the process is continuous. This relatively short dissociation zone is usually formed at about from 12 to 30 inches below the gas nozzles depending upon how the air is introduced into the furnace, as, e. g., the air can be introduced tangential to the nozzle 7 instead of axially as shown in drawings or other means can be used to produce turbulent flow. The dissociation zone can be moved up or down by varying the air velocity or the length and injection angle of nozzle 7. I prefer to extend the air nozzle 7 sufficiently beyond the gas ports 10 to prevent excessive heating of the furnace top. The velocity of the products of dissociation is such as to permit only a fraction of one second to elapse while they are passing the high temperature zone, but this is sufficient to permit of the catalytic influence of the refractory surface on the dissociation of the hydrocarbon so that dissociation proceeds continuously at a lively rate without deterioration of the carbon black particles.

A quick partial cooling of the dissociation products is desirable to prevent the formation of coarse carbon particles and excessive quantities of reformed products such as napthalene. Quick cooling also prevents the reaction between any $CO_2$ present and the carbon to form CO which is wasteful of carbon as, e. g., $2CO_2+C_2=4CO$. Part or all of the cooling may be accomplished by means of a suitable liquid spray 27 where a cooling medium such as water is admitted thru pipe 26. The cooling medium should be free from dissolved solids which would add an ash content to the carbon product.

The cooled products of dissociation are passed from furnace thru pipe 11 and valve 12 to a suitable carbon separator 15 which may be of any well known type such as bag filters or an electrical precipitator. When the electrical precipitator is used, it is usually followed by a cyclone type of collector to separate the electrically charged carbon particles which escape the precipitator. The carbon is removed from the separator by suitable valve means 16. In order to prevent the contamination of the carbon black with condensible products such as napthalene, the dissociations products are cooled only to about 500 to 600 degrees F. before entering the carbon separator. Such temperatures are permissible with wire screens or wire inserted asbestos bag filters. Even higher temperatures are preferable when an electrical precipitator type of carbon separator is used. With temperature of over about 500 degrees F. the condensible products are carried out with the dissociation gases instead of being absorbed by the carbon product.

Part or all of the gases from the carbon separator 15 may be rejected from the process thru pipe 17 and valve 18 or part may be circulated thru pipe 19 to wash-box 20 where the condensible matter is removed and from whence the remaining gases are drawn thru valve 21 by blower 22 and recirculated thru pipe 23 and valve 24 to furnace connection 25 where they are intermingled with the products of dissociation as a diluent and cooling medium. The carbon particles are thus farther separated from each other and prevented from forming coarse particles. The wash-box 20 is provided with a suitable overflow and seal 30 and water supply pipe 29 with valve 28.

Some carbon will gradually accumulate on the furnace wall. This carbon can be removed by stopping the gas supply for a short interval so that the air supplied will burn the deposited carbon in which case the products of combustion can be discharged thru valve 13 and stack 14 to the atmosphere, or they can be discharged thru carbon separator 15 and to the atmosphere thru pipe 17 and valve 18. The latter method can be used when it is desired to heat the carbon separating apparatus for reasons previously stated. The temperature of the carbon separator 15 is indicated by a suitable thermocouple 39.

The furnace temperature at the dissociation zone is maintained preferably between 2000 and 2400 degrees F. Any desired temperature is easily maintained by controlling either the quantity of air or the quantity of hydrocarbons such as natural gas, as, e. g., the quantity of air is fixed at a certain definite rate, then the quantity of gas is varied to maintain the temperature desired. If the temperature increases, more gas is admitted and if the temperature decreases less gas is admitted so that a more complete combustion ensues with an increase of temperature in the furnace. The temperature control can be made automatic by regulating the gas or air supply by means of the thermoccuple 32 in conjunction with suitable and well known devices for the purpose.

The furnace may be of any suitable cross section such as either circular or rectangular. Among other possible modifications, the discharge from furnace could as well be from the bottom instead of from the side as shown in the drawings, and while a downward flow of gas is preferable yet the gas and air supply could be at the bottom to give an upward flow. Further cooling of the dissociation products could as well be accomplished between the furnace discharge 11 and the carbon separator 15.

Figure 2:
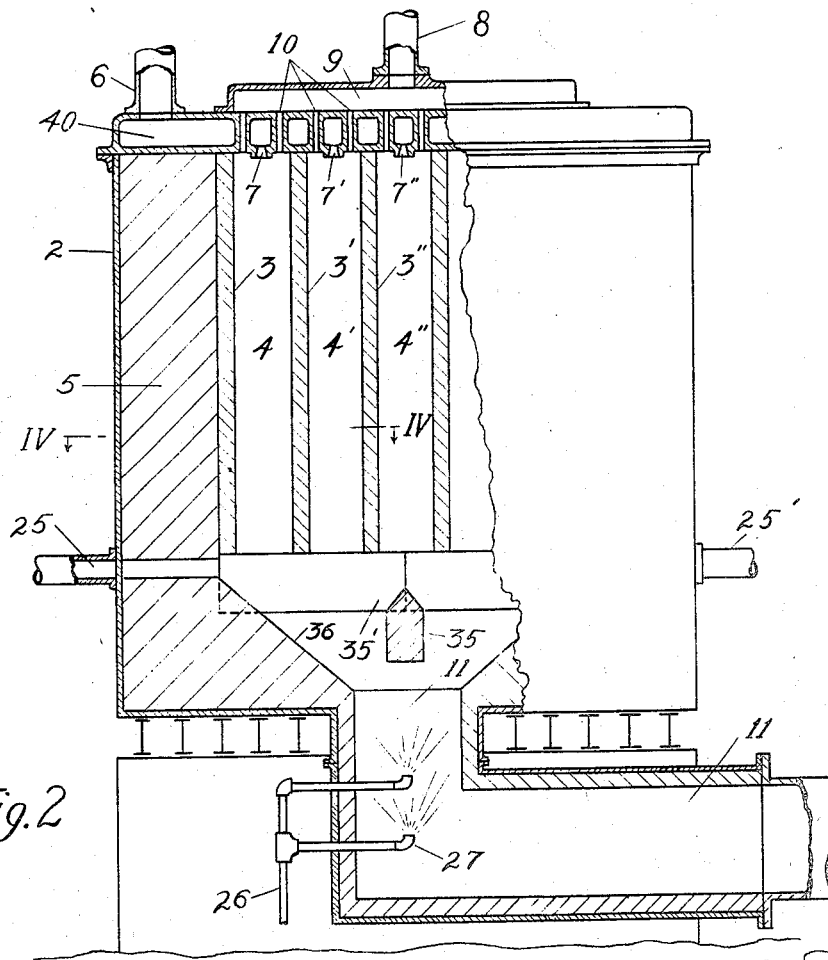
Fig. 2 is an elevation partly in section showing a modification of Fig. 1.
Figures 3, 4:
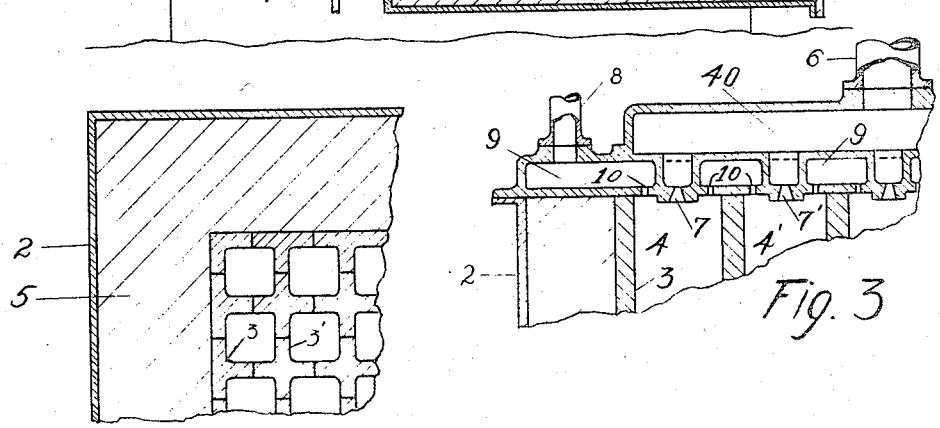
Fig. 3 is a fragmentary vertical section showing a modification of Fig. 2.
Fig. 4 is a fragmentary section on line IV—IV of Fig. 2.

Fig. 2 shows another modification of furnace suitable for carrying out the process of the present invention. This furnace consists of a plurality of tubes 3, 3' etc. such as the single tube 3 shown in Fig. 1. The tubes of Fig. 2 may be of rectangular cross-section as shown in Fig. 4 or they may be of circular or other suitable cross-section. The tubes may be supported by suitable arches or tile 35 and 35'. The furnace walls preferably converge as at 36 to the outlet 11 so as to increase the velocity of the dissociation products as they leave the furnace and thereby prevent the carbon from settling out in the lower portion of the furnace. The outer shell 2 is preferably of steel construction. 5 is a lining of suitable refractory material. The furnace shell is shown as rectangular in cross-section as indicated in Fig. 4 but it could as well be of circular cross-section.

In Fig. 2 a hydrocarbon gas is admitted at 8 to chamber 9 and thru a plurality of ports 10 to furnace passages 4, 4' etc. An oxidizing agent such as air is admitted at 6 to chamber 40 which is communicatively connected to nozzles 7, 7' etc. leading to furnace passages 4, 4' etc. The hydrocarbon gas thus enters the furnace between the refractory surface 3 and the oxidizing agent entering at 7 just as previously explained for Fig. 1.

Fig. 3 shows a modification of the furnace top shown in Fig. 2. In Fig. 3 the oxidizing agent is admitted at 6 to chamber 40 communicating with the furnace passages 4, 4' etc. thru nozzles 7, 7' etc. The hydrocarbon or hydrocarbon-containing gas is introduced at 8 to chamber 9 which is communicatively connected thru a plurality of ports 10 to furnace passages 4, 4' etc. Cooling of the dissociation products can be accomplished exactly as explained for Fig. 1, i. e., by a liquid spray 27 or by recycled dissociation gases thru connections 25 and 25' or by both methods.

A modification of Fig. 2 is shown in Fig. 5 where checkerwork is substituted for the tubes of Fig. 2. The checkerwork is constructed preferably of such units 33 as shown in perspective in Fig. 6. These checkerunits, described in my U. S. Patent 1,980,827, Nov. 13, 1934, provide a maximum of surface per cubic foot of checkerwork without presenting any abrupt contacting surfaces to the gas flow. The outer shell 2 is preferably of steel construction. 5 is a lining of suitable refractory material. A hydrocarbon-containing gas is admitted at the header 8 communicatively joined thru pipes 9 to the lateral pipes 37 having a plurality of ports 10 opening to furnace. Air or an oxygen-containing gas is introduced at 6 to the space 38 above checkerwork. Refractory units 34 shown in perspective in Fig. 7 and having openings or nozzles 7 serve to distribute the air uniformly in the gas passages formed by the checkerwork so that the hydrocarbon is admitted between the checkerwork refractory surfaces and the air streams. The checkerwork is supported on suitable arches or tile 35. The furnace sides preferably converge as at 36 to the outlet 11, suitable liquid spray cooling means 27 is provided and diluent gases may be supplied as at 25 or 25' as was described for Fig. 1. The diluent gas supplied at 25 and 25' is preferably admitted to offset passages 41 and 42 so as to be distributed uniformly around the checkerwork of furnace. The furnaces shown in Fig. 2 and Fig. 5 could be of either circular or rectangular cross-section. A rectangular cross-section with a width greater than the length would facilitate the introduction of diluents.

In starting up the process of the present invention with any of the furnaces described, the air or other oxidizing agent and a hydrocarbon such as natural gas are admitted to the furnace in proportions suitable for complete combustion, then after the apparatus has been heated to the dissociation temperature of the hydrocarbons, the air and gas rates are adjusted for the incomplete combustion of the hydrocarbons and the process operates continuously from the heat produced by the incomplete combustion. Carbon black is thus produced as a result of the incomplete combustion of hydrocarbons and the catalytic influence of the refractory surfaces.

The refractory surfaces herein referred to may consist of any heat resisting material such as fire brick, carborundum, or metal alloy.

It is to be understood that while carbon separating and gas recycling means are omitted in the drawings of the furnaces shown in Fig. 2 and Fig. 5, yet apparatus similar to that shown with the furnace in Fig. 1 can be used with the furnaces shown in Fig. 2 and Fig. 5. The carbon black could also be collected in any of the well known types of wash-box, as, e. g., the carbon separator 15 of Fig. 1 could be omitted and the carbon collected in the wash-box 20, in which case the carbon would be discharged from the wash-box thru the overflow 30 into an open basin (not shown) where it could be skimmed off the water and dried.

Obviously, there are many other ways in which a furnace suitable for carrying out the process of the present invention could be designed as, e. g., the tubes 3 of Fig. 2 or the checker units 33 of Fig. 5 could be replaced by parallel dividing walls to form rectangular passages in which the incomplete combustion of hydrocarbons can be carried on in the presence of the catalytic influence of the dividing walls. I have obtained good results by spreading the air stream, as, e. g., by inserting a concentric cone in nozzle 7 of Figs.

1, 2 and 3. The same results can be obtained by inserting a concentric circular disc at end of air nozzle 7. Spreading the air stream in this manner tends to shorted the hot dissociation zone and keep it nearer the top of furnace.

While as previously stated, cooling or partial cooling of the products of dissociation immediately after dissociation is desirable, yet it is to be understood that further cooling between the furnace and the carbon separating means in any wall known manner may be utilized with the process of the present invention. In cooling immediately after dissociation, it is only necessary to cool the products of dissociation sufficiently low to prevent deterioration of the carbon black. Further cooling can then be carried out between the furnace and the carbon separating means.

Gases other than recycled dissociation gases from the process can as well be used as diluents with the present process, as, e. g., combustion gases or steam. It is also within the scope of the present invention to admit diluent gases with the hydrocarbons to be dissociated or with the oxidizing agent, as, e. g., steam could be introduced with the heavier hydrocarbons. In general, the quality of carbon black produced by the incomplete combustion of the heavier hydrocarbons can be improved by increased quantities of diluents. However, a very high quality of carbon black can be produced with the process of the present invention without any diluents.

The process of the present invention is obviously a great improvement over the thermal processes which depend on alternate heating and dissociation periods wherein the apparatus is productive for only one-half of the time. Furthermore, the carbon black produced by the process of the present invention is of a decidedly superior quality in that it is an extremely hard and fine carbon black and equal to channel black in practically all respects.

Another advantage is that the greatly increased yield of fine hard carbon black obtained with the process of the present invention results in a decidedly great saving of such natural resources as natural gas as compared with the present wasteful channel methods of producing hard carbon black.

Obviously there are other ways of carrying out the process of the present invention without departing from the spirit and scope of the present invention, therefore I do not wish to be understood as limiting myself except by the following claims when construed in the light of the prior art.

I claim:

1. The process of producing carbon black by the incomplete combustion of a hydrocarbon-containing gas which comprises introducing a stream of air insufficient for complete combustion into a retort passage of refractory material which provides a substantially enveloping space around said air stream, simultaneously introducing into said enveloping space and adjacent the point of introduction of the air stream a hydrocarbon-containing gas thereby to effect diffusion of the hydrocarbon-containing gas into said air stream in an axial and inward direction with reference to the wall of said passage and to initiate partial combustion of the hydrocarbon substantially at the outer portion of the air stream and to maintain a dissociation temperature effective for producing carbon black, and thereupon separating the carbon black from the gases.

2. The process of producing carbon black by the incomplete combustion of a hydrocarbon-containing gas which comprises introducing a stream of air insufficient for complete combustion into a retort passage of refractory material which provides a substantially enveloping space around said air stream, simultaneously introducing into said enveloping space and adjacent the point of introduction of the air stream a hydrocarbon-containing gas thereby to effect diffusion of the hydrocarbon-containing gas into said air stream in an axial and inward direction from the wall of said passage and to initiate partial combustion of the hydrocarbon substantially at the outer portion of the air stream and in a flame tending to converge inwardly from the wall of said passage, thereupon maintaining such incomplete combustion at a dissociation temperature effective for producing carbon black, and finally separating the carbon black from the gases.

3. The process of producing carbon black by the incomplete combustion of a hydrocarbon-containing gas, which comprises introducing a stream of air insufficient for complete combustion into a retort passage of refractory material which provides a substantially enveloping space about said stream, simultaneously introducing into said enveloping space and adjacent the point of introduction of the air stream a hydrocarbon-containing gas, diffusing the hydrocarbon-containing gas into the air stream in an axial and inward direction from the wall of the passage thereby initiating partial combustion of the hydrocarbon substantially at the outer surface of the air stream and at a dissociation temperature effective to produce carbon black, and thereupon separating the carbon black from the gases.

4. The process of producing carbon black by the incomplete combustion of a hydrocarbon-containing gas, which comprises introducing a stream of air into a retort passage of refractory material which provides a substantially enveloping space about said air stream, simultaneously introducing into said enveloping space and adjacent the point of introduction of the air stream a hydrocarbon-containing gas, regulating the hydrocarbon-containing gas and the air to relative quantities insufficient for complete combustion, diffusing the hydrocarbon-containing gas into the air stream in an axial and inward direction with reference to the wall of the passage thereby initiating partial combustion of the hydrocarbon substantially at the outer surface of the air stream and at a temperature effective to produce carbon black, and thereupon separating the carbon black from the gases.

5. The process of producing carbon black by the incomplete combustion of hydrocarbon-containing gas which comprises introducing a stream of air insufficient for complete combustion into a retort passage of refractory material which provides a substantially enveloping space around said stream, simultaneously introducing into said enveloping space and adjacent the point of introduction of the air stream a hydrocarbon-containing gas, initiating partial combustion of the hydrocarbon at the outer surface of the air stream and maintaining a dissociation temperature effective to produce carbon black by effecting diffusion of the hydrocarbon-containing gas into the air stream in an axial and inward direction, and thereupon separating the carbon black from the gases.

6. The process of producing carbon black by the incomplete combustion of a hydrocarbon-containing gas which comprises introducing a stream of air insufficient for complete combustion into a retort passage of refractory material which provides a substantially enveloping space around said air stream, simultaneously introducing into said enveloping space and adjacent the point of introduction of the air stream a hydrocarbon-containing gas, effecting initial partial combustion of the hydrocarbon at the outer surface of the air stream and diffusing the hydrocarbon-containing gas into the air stream in an axial and inward direction thereby maintaining such partial combustion at a dissociation temperature for producing carbon black, and thereafter separating the carbon black from the gases.

7. The process of producing carbon black by the incomplete combustion of a natural gas, which comprises introducing a stream of air insufficient for complete combustion into an end of a retort passage of refractory material which provides a substantially enveloping space around said air stream, simultaneously introducing into said enveloping space and through said end of the passage a flow of natural gas, diffusing the natural gas into the air stream in an axial and inward direction with reference to the wall of the passage thereby effecting partial combustion of the natural gas at a temperature effective for producing carbon black and in a flame which tends to converge inwardly, and thereafter separating the carbon black from the gases.

8. The process of producing carbon black by the incomplete combustion of natural gas, which comprises introducing a flow of air insufficient for complete combustion into an end of a retort passage of refractory material which provides a substantially enveloping space around said air flow, simultaneously introducing a flow of natural gas into said enveloping space and rearwardly of the point of introduction of the air flow, diffusing the natural gas into the air flow in an axial and inward direction with reference to the wall of said passage, thereby effecting partial combustion of the natural gas at a temperature effective for producing carbon black and in a flame which tends to converge inwardly, and thereafter separating the carbon black from the gases.

9. The process of producing carbon black by the incomplete combustion of a gaseous or vaporized hydrocarbon and under the catalytic influence of a refractory material, which comprises introducing a flow of a substantially non-combustible oxygen-supplying gas, insufficient for complete combustion, into a retort passage of refractory material which provides a substantially enveloping space around said gas flow, introducing into said enveloping space and substantially at the point of introduction of the flow of oxygen-supplying gas a flow of gaseous or vaporized hydrocarbon, diffusing the hydrocarbon into said gas flow in an axial and inward direction with reference to the wall of the passage, thereby initiating partial combustion of the hydrocarbon substantially at the surface of the flow of oxygen-supplying gas and effecting diffusion of the liberated carbon black particles generally towards the axis of the passage, and thereafter separating the liberated carbon black particles from the gases.

10. The process of producing carbon black by the incomplete combustion of a hydrocarbon-containing gas, which comprises introducing a flow of a substantially non-combustible oxygen-supplying gas, insufficient for complete combustion, into a retort passage of refractory material which provides a substantially enveloping space around said flow of oxygen-supplying gas, simultaneously introducing a flow of hydrocarbon-containing gas into said enveloping space and rearwardly of the point of introduction of the flow of oxygen-supplying gas thereby to effect diffusion of the hydrocarbon-containing gas into the flow of oxygen-supplying gas in an axial and inward direction with reference to the wall of the passage and to initiate partial combustion of the hydrocarbon substantially at the outer portion of the flow of oxygen-supplying gas, thereupon maintaining such incomplete combustion at a dissociation temperature effective for producing carbon black, and finally separating the carbon black from the gases.

11. The process of producing carbon black by the incomplete combustion of a hydrocarbon-containing gas, which comprises introducing a flow of a substantially non-combustible oxygen-supplying gas into a retort passage of refractory material which provides a substantially enveloping space about said flow of oxygen-supplying gas, simultaneously introducing a hydrocarbon-containing gas into said enveloping space and rearwardly of the point of introduction of the flow of oxygen-supplying gas, regulating the hydrocarbon-containing gas and the oxygen-supplying gas to relative quantities insufficient for complete combustion, diffusing the hydrocarbon-containing gas into the flow of oxygen-supplying gas in an axial and inward direction with reference to the wall of the passage thereby initiating partial combustion of the hydrocarbon substantially at the outer surface of the flow of oxygen-supplying gas, maintaining such partial combustion at a dissociation temperature effective for producing carbon black, and finally separating the carbon black from the gases.

12. In a process for producing carbon black by the incomplete combustion of a hydrocarbon-containing gas in a retort passage of refractory material having adjacent one end thereof a substantially centrally disposed inlet for the introduction of a flow of air and one or more inlets for the introduction of the hydrocarbon-containing gas into the passage space surrounding said centrally disposed inlet, the steps of simultaneously introducing regulated quantities of the hydrocarbon-containing gas and the air into the retort passage through their respective inlets, whereby to effect diffusion of the gas from the space surrounding the centrally disposed inlet into the flow of air and to initiate partial combustion of the hydrocarbon, and thereafter maintaining such partial combustion at a temperature effective for producing carbon black.

FORREST C. REED.